US012683164B2

(12) United States Patent
Jo et al.

(10) Patent No.: US 12,683,164 B2
(45) Date of Patent: Jul. 14, 2026

(54) NEGATIVE ELECTRODE FOR LITHIUM ION SECONDARY BATTERY

(71) Applicant: LG ENERGY SOLUTION, LTD., Seoul (KR)

(72) Inventors: Mi-Ru Jo, Daejeon (KR); Tae-Gyun Noh, Daejeon (KR); Jeong-In Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/012,217

(22) PCT Filed: Oct. 12, 2021

(86) PCT No.: PCT/KR2021/014052
§ 371 (c)(1),
(2) Date: Dec. 21, 2022

(87) PCT Pub. No.: WO2022/080836
PCT Pub. Date: Apr. 21, 2022

(65) Prior Publication Data
US 2023/0261191 A1      Aug. 17, 2023

(30) Foreign Application Priority Data

Oct. 12, 2020      (KR) ........................ 10-2020-0131460

(51) Int. Cl.
*H01M 4/587* (2010.01)
*H01M 4/02* (2006.01)
(Continued)

(52) U.S. Cl.
CPC ......... *H01M 4/587* (2013.01); *H01M 4/0404* (2013.01); *H01M 4/133* (2013.01);
(Continued)

(58) Field of Classification Search
CPC .... H01M 4/587; H01M 4/133; H01M 4/0404; H01M 10/0525; H01M 2004/021; H01M 2004/027
See application file for complete search history.

(56) References Cited

U.S. PATENT DOCUMENTS

2007/0248884 A1      10/2007      Tsuchiya
2008/0070107 A1      3/2008      Kasamatsu et al.
(Continued)

FOREIGN PATENT DOCUMENTS

CN      111668452 A      9/2020
EP      3054509 B1      11/2017
(Continued)

OTHER PUBLICATIONS

International Search Report issued in corresponding International Patent Application No. PCT/KR2021/014052 issued dated Jan. 25, 2022.
(Continued)

*Primary Examiner* — Basia A Ridley
*Assistant Examiner* — Heng M. Chan
(74) *Attorney, Agent, or Firm* — Morgan, Lewis & Bockius LLP

(57) ABSTRACT

The negative electrode includes a carbon-coated artificial graphite in combination with a non-coated artificial graphite as a negative electrode active material, and thus shows an effect of preventing deterioration caused by deformation of a carbon-coated artificial graphite occurring upon the pressing by virtue of the introduction of the non-coated artificial graphite. The negative electrode maintains electrochemical characteristics well, and for example, is prevented from deterioration of a carbon-coated artificial graphite, and thus is suitable for manufacturing a battery for quick charging.

15 Claims, 3 Drawing Sheets

(51) Int. Cl.

| | |
|---|---|
| *H01M 4/04* | (2006.01) |
| *H01M 4/133* | (2010.01) |
| *H01M 10/0525* | (2010.01) |

(52) U.S. Cl.

CPC .. *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2010/0279168 A1 | 11/2010 | Lee et al. | |
| 2015/0280221 A1 | 10/2015 | Abdelsalam et al. | |
| 2018/0190985 A1* | 7/2018 | Choi | H01M 10/052 |
| 2018/0205064 A1* | 7/2018 | Lee | H01M 4/622 |
| 2018/0287145 A1* | 10/2018 | Lee | H01M 4/625 |
| 2019/0027740 A1 | 1/2019 | Lee et al. | |
| 2019/0305308 A1 | 10/2019 | Lee et al. | |
| 2020/0119336 A1 | 4/2020 | Shinomiya | |
| 2020/0403221 A1 | 12/2020 | Niina et al. | |
| 2021/0075016 A1* | 3/2021 | Choi | H01M 10/0525 |
| 2021/0126248 A1* | 4/2021 | Choi | H01M 4/587 |
| 2021/0143414 A1 | 5/2021 | Guo et al. | |
| 2021/0159489 A1 | 5/2021 | Sugaya et al. | |

FOREIGN PATENT DOCUMENTS

| | | | |
|---|---|---|---|
| JP | 2001-345122 A | | 12/2001 |
| JP | 2005294011 A | * | 10/2005 |
| JP | 2007-273183 A | | 10/2007 |
| JP | 2011-508956 A | | 3/2011 |
| JP | 2015-146272 A | | 8/2015 |
| JP | 2016048668 A | * | 4/2016 |
| JP | WO2018/225515 A1 | | 12/2018 | |
| JP | 6499427 B2 | | 4/2019 | |
| JP | WO2019/167613 A1 | | 9/2019 | |
| KR | 10-2015-0070971 A | | 6/2015 | |
| KR | 10-2015-0086288 A | | 7/2015 | |
| KR | 10-2018-0040268 A | | 4/2018 | |
| KR | 10-2018-0125312 A | | 11/2018 | |
| KR | 10-1966144 B1 | | 4/2019 | |
| KR | 10-2019-0060719 A | | 6/2019 | |
| KR | 10-2019-0121068 A | | 10/2019 | |
| KR | 10-2088491 B1 | | 3/2020 | |
| KR | 10-2020-0073801 A | | 6/2020 | |
| KR | 10-2020-0085587 A | | 7/2020 | |
| KR | 10-2426797 B1 | | 7/2022 | |
| WO | 2006/061936 A1 | | 6/2006 | |
| WO | WO-2019164347 A1 | * | 8/2019 | H01M 4/366 |
| WO | WO-2019194554 A1 | * | 10/2019 | C01B 32/21 |
| WO | 2019/239652 A1 | | 12/2019 | |

OTHER PUBLICATIONS

Written Opinion issued in corresponding International Patent Application No. PCT/KR2021/014052 issued dated Jan. 25, 2022.

International Search Report (with partial translation) and Written Opinion dated Jan. 25, 2022, for corresponding International Patent Application No. PCT/KR2021/014052.

Office Action issued in corresponding Japanese Patent Application No. 2022-575257, dated Jan. 29, 2024.

Extended European search report, dated Nov. 21, 2024, issued in corresponding European Patent Application No. 21880483.9.

Office Action issued in corresponding Indian Patent Application No. 202317022967, dated May 20, 2026.

\* cited by examiner

NEGATIVE ELECTRODE FOR LITHIUM ION SECONDARY BATTERY

TECHNICAL FIELD

The present application claims priority to Korean Patent Application No. 10-2020-0131460 filed on Oct. 12, 2020 in the Republic of Korea. The present disclosure relates to a negative electrode for a lithium-ion secondary battery and a secondary battery including the same. Particularly, the present disclosure relates to a negative electrode that may be used effectively in a battery for quick charging and a second battery including the same.

BACKGROUND ART

As technical development and needs for mobile instruments have been increased, secondary batteries that is rechargeable and can be downsized and provided with high capacity have been increasingly in demand. In addition, among such secondary batteries, lithium secondary batteries having high energy density and operating voltage have been commercialized and used widely.

A lithium secondary battery has a structure including an electrode assembly having a positive electrode and a negative electrode, each of which includes an active material coated on an electrode current collector, and a porous separator interposed between both electrodes; and a lithium salt-containing electrolyte injected to the electrode assembly. The electrode is obtained by applying slurry including an active material, a binder and a conductive material dispersed in a solvent to a current collector, followed by drying and pressing.

In addition, the fundamental performance characteristics, such as capacity, output and life, of a lithium secondary battery are significantly affected by the negative electrode material. To maximize the performance of a battery, it is required for the negative electrode active material to meet several requirements, including an electrochemical reaction potential close to that of lithium metal, high reversibility of reaction with lithium ions and a high lithium-ion diffusion rate in the active material. Graphite has been used frequently as a material satisfying such requirements.

To satisfy various electrochemical characteristics of a battery, there has been suggested a combination of multiple kinds of graphite or a negative electrode having a multilayer structure. In the case of the conventional electrode having a multilayer structure, each layer includes only one type of electrode active material, and for example, the upper layer and the lower layer include a negative electrode active material different from each other (upper layer material a/lower layer material b), or the upper layer and the lower layer include the same negative electrode active material (upper layer material a/lower layer material a, or upper layer material b/lower layer material b). However, in the case of the negative electrode including a stack of layers each including a single type of material, there are problems in that quick charge characteristic are poor, or high-temperature characteristics and capacity are degraded rapidly. There is another problem in that cracks are generated in the electrode layer, while drying the electrode.

Particularly, when using artificial graphite as a negative electrode active material in a battery for high-rate (2 C rate or higher) quick charging, there is a problem of low conductivity. To improve the conductivity, a method for coating the surface of artificial graphite with carbon (soft carbon or hard carbon) has been considered. However, in this case, the electrode active material shows increased strength due to the carbon coating so that the electrode active material may be deformed (the degree of orientation is increased, or the active material is broken) during the process for manufacturing a battery (pressing step), resulting in the problems of side reactions and deterioration of high-temperature characteristics.

Meanwhile, particularly, as the thickness of the electrode active material is increased, the electrode binder migrates toward the top layer according to the evaporation of a solvent, while the electrode is dried, and thus the electrode binder is distributed predominantly in the top layer portion to cause a problem of degradation of the binding force between the electrode and the current collector.

DISCLOSURE

Technical Problem

The present disclosure is designed to solve the problems of the related art, and therefore the present disclosure is directed to providing a negative electrode having a multilayer structure, which includes a carbon-coated artificial graphite and a non-coated artificial graphite as a negative electrode active material. The present disclosure is also directed to providing a lithium-ion secondary battery including the negative electrode. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

According to the first embodiment of the present disclosure, there is provided a negative electrode for a lithium ion secondary battery, including a negative electrode current collector and a negative electrode active material layer formed on at least one surface of the negative electrode current collector, wherein the negative electrode active material layer includes a lower layer formed on the surface of the current collector and an upper layer formed on the top of the lower layer, each of the lower layer and the upper layer independently includes a negative electrode mixture containing a negative electrode active material, a conductive material and a binder, each of the upper layer and the lower layer independently includes a negative electrode active material a and a negative electrode active material b, the negative electrode active material a is an artificial graphite surface-coated with a carbonaceous material, and the negative electrode active material b is an artificial graphite and is not coated.

According to the second embodiment of the present disclosure, there is provided the negative electrode for a lithium-ion secondary battery as defined in the first embodiment, wherein the content of the negative electrode active material b in the upper layer is 40-60 wt % based on the total content of the negative electrode active material a and the negative electrode active material b.

According to the third embodiment of the present disclosure, there is provided the negative electrode for a lithium-ion secondary battery as defined in the first or the second embodiment, wherein the proportion of the content of the binder in the negative electrode mixture of the lower layer is relatively higher than the proportion of the content of the binder in the negative electrode mixture of the upper layer.

According to the fourth embodiment of the present disclosure, there is provided the negative electrode for a lithium-ion secondary battery as defined in any one of the first to the third embodiments, wherein each of the artificial graphite of the negative electrode active material a and the artificial graphite of the negative electrode active material b independently has a degree of orientation (ratio of $I_{110}$ to $I_{004}$ of particles) of 3-25.

According to the fifth embodiment of the present disclosure, there is provided the negative electrode for a lithium-ion secondary battery as defined in any one of the first to the fourth embodiments, wherein each of the artificial graphite of the negative electrode active material a and the artificial graphite of the negative electrode active material b independently has a specific surface area of 0.5-5 $m^2/g$.

According to the sixth embodiment of the present disclosure, there is provided the negative electrode for a lithium-ion secondary battery as defined in any one of the first to the fifth embodiments, wherein the carbonaceous material of the negative electrode active material a includes a low-crystallinity carbonaceous material and/or an amorphous carbonaceous material.

According to the seventh embodiment of the present disclosure, there is provided the negative electrode for a lithium-ion secondary battery as defined in any one of the first to the sixth embodiments, wherein the negative electrode active material a includes an artificial graphite and a carbon coating layer formed on the surface of artificial graphite, and the carbon coating layer is present in an amount of 1-10 wt % based on 100 wt % of the negative electrode active material a.

According to the eighth embodiment of the present disclosure, there is provided the negative electrode for a lithium-ion secondary battery as defined in any one of the first to the seventh embodiments, wherein the upper layer and the lower layer include the same negative electrode active material a and the same negative electrode active material b.

According to the ninth embodiment of the present disclosure, there is provided a method for manufacturing the negative electrode as defined in any one of the first to the eighth embodiments, including: preparing each of first negative electrode slurry containing a lower layer negative electrode mixture and second negative electrode slurry containing an upper layer negative electrode mixture; and sequentially or simultaneously applying the first negative electrode slurry and the second negative electrode slurry onto a negative electrode current collector, followed by drying.

According to the tenth embodiment of the present disclosure, there is provided a secondary battery including the negative electrode as defined in any one of the first to the eighth embodiments, which includes a positive electrode including lithium cobalt oxide (LCO) or lithium nickel cobalt manganese oxide (NCM), uses an electrolyte having an ion conductivity of 6.5 mS/cm or more and containing a lithium salt at a concentration of 0.8-1.4 M, and includes a separator made of a polyethylene porous film (thickness: 3-15 μm) and optionally provided with an inorganic coating layer.

Advantageous Effects

The negative electrode according to the present disclosure includes a carbon-coated artificial graphite in combination with a non-coated artificial graphite as a negative electrode active material, and thus shows an effect of preventing deterioration caused by deformation of a carbon-coated artificial graphite occurring upon the pressing by virtue of the introduction of the non-coated artificial graphite.

The negative electrode maintains electrochemical characteristics well, and for example, is prevented from deterioration of a carbon-coated artificial graphite, and thus is suitable for manufacturing a battery for quick charging.

Meanwhile, the negative electrode according to the present disclosure has a dual layer structure, wherein the upper layer and the lower layer of the electrode may have a different negative electrode active material composition, and particularly, the upper layer may have a higher content of a carbon-coated artificial graphite. In this manner, it is possible to provide a negative electrode more suitable for quick charging characteristics.

In addition, since the negative electrode is manufactured to have a dual layer structure by controlling the content of the binder of the negative electrode, it is possible to prevent migration of the binder in the negative electrode and to improve the adhesion between the electrode and the current collector.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
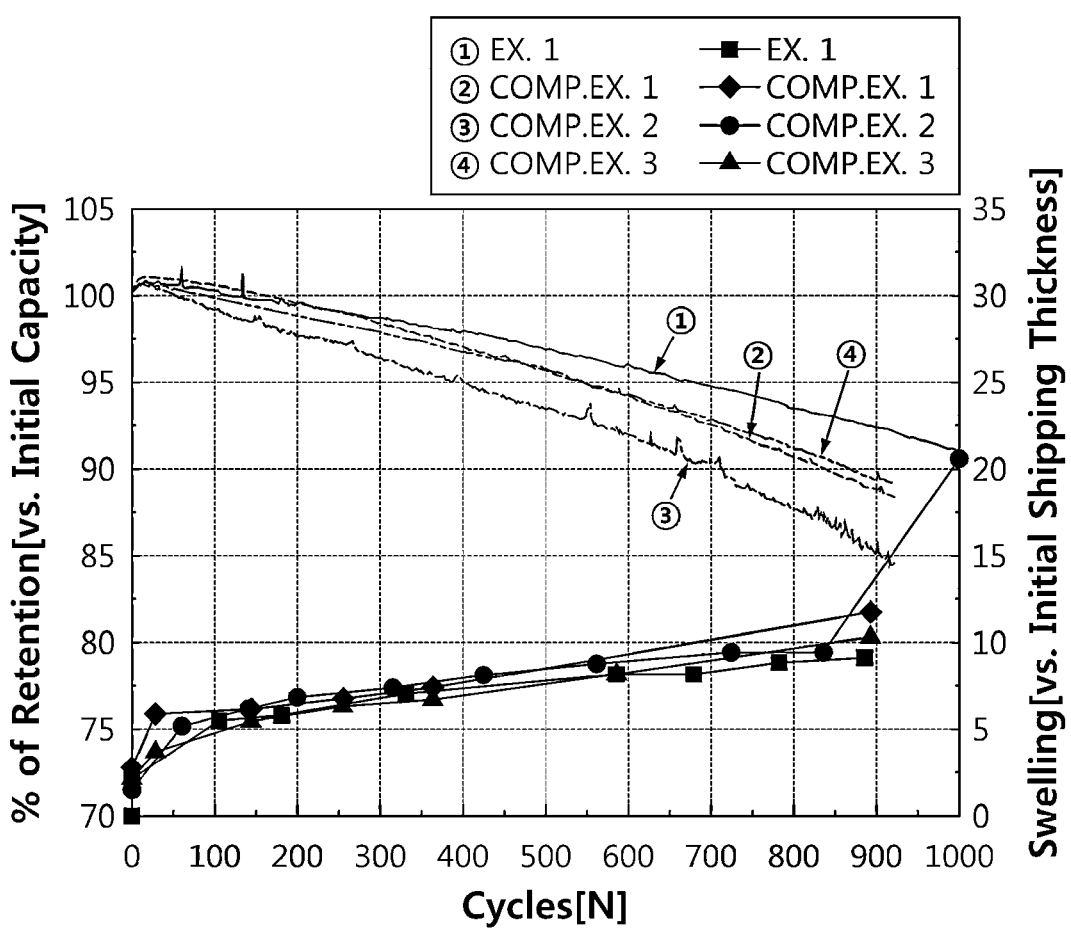
FIG. 1 to FIG. 3 are graphs illustrating the test results of capacity retention and volumetric swelling ratio of Example 1 and Comparative Examples 1-3 depending on temperature and C-rate.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The present disclosure relates to a negative electrode for a lithium-ion secondary battery.

In one aspect of the present disclosure, there is provided a negative electrode for a lithium-ion secondary battery, including a negative electrode current collector and a negative electrode active material layer formed on at least one surface of the negative electrode current collector. The negative electrode active material layer includes a lower layer formed on the surface of the current collector and an upper layer formed on the top of the lower layer. Each of the lower layer and the upper layer independently includes a negative electrode mixture (an upper layer negative electrode mixture and a lower layer negative electrode mixture, respectively) containing a negative electrode active material, a conductive material and a binder. Each of the upper layer and the lower layer independently includes a negative electrode active material a and a negative electrode active material b, the negative electrode active material b includes an artificial graphite, and the negative electrode active material a includes an artificial graphite and a carbon coating layer formed on the surface of artificial graphite. The negative electrode active material b includes no carbon coating layer.

Herein, in general, an artificial graphite may be prepared through a graphitization process including sintering raw materials, such as coal tar, coal tar pitch and petroleum-based heavy oil, at a temperature of 2,500° C. or higher. After such graphitization, the resultant product is subjected to particle size adjustment, such as pulverization and secondary particle formation, so that it may be used as a negative electrode active material.

In general, an artificial graphite includes crystals distributed randomly in particles, has a lower sphericity as compared to a natural graphite and a slightly sharp shape. Such artificial graphite may be provided in a powdery shape, a flake-like shape, a block-like shape, a sheet-like shape or a rod-like shape, but preferably has an isotropic degree of orientation of crystallites so that the lithium-ion migration distance may be reduced to improve the output characteristics. Considering this, an artificial graphite may have a flake-like shape and/or a sheet-like shape.

In addition, the artificial graphite used herein may have a degree of orientation (ratio of $I_{110}$ to $I_{004}$ of particles) of 3-25. When the artificial graphite has a degree of orientation of less than 3, there are too many voids in the particles to cause a decrease in capacity per volume and an increase in irreversible capacity. When the degree of orientation is larger than 25, the artificial graphite shows a large change in volume during charge/discharge, which may result in degradation of life characteristics, undesirably. According to an embodiment of the present disclosure, the degree of orientation may be 12-25 with a view to controlling porosity and irreversible capacity suitably.

Herein, the degree of orientation may be determined through the peak intensity ratio of (110) surface to (004) surface by X-ray diffractometry (XRD). Particularly, $I_{004}$ causes diffraction on the surface stacked in the C-axis direction (longitudinal direction) of graphite and forms a higher and broader peak as the diffraction is increased. $I_{100}$ corresponds to A-axis direction (transverse direction). Herein, the degree of orientation is evaluated as the area ratio of the two peaks. The method for determining the degree of orientation of graphite is known to those skilled in the art, and such a known method may be used herein.

According to an embodiment of the present disclosure, the X-ray diffractometry may be carried out with an X-ray diffractometer, Bruker D4 Endeavor, by using Cu—Kα rays. Meanwhile, if necessary, the measured values may be corrected through the Topas3 fitting program.

Particularly, XRD is carried out under the following conditions.

Target: Cu(Kα-ray) graphite monochromatization device
Slit: divergence slit=1°, convergence slit=0.1 mm, scattering slit=1°
Measurement region and step angle/measurement time:
(110) surface: 76.5°<2θ<78.5°, 0.01°/3 sec
(004) surface: 53.5°<2θ<56.0°, 0.01°/3 sec, wherein 2θ represents a diffraction angle. The above XRD analysis is a typical example, and the other methods may also be used. In this manner, it is possible to determine the degree of orientation.

This will be applied to the determination of the degree of orientation of natural graphite as described hereinafter.

The artificial graphite used according to an embodiment of the present disclosure includes commercially available mesophase carbon microbeads (MCMB), mesophase pitch-based carbon fibers (MPCF), block-like graphitized artificial graphite, powder-like graphitized artificial graphite, or the like, and may be an artificial graphite having a sphericity of 0.91 or less, preferably 0.6-0.91, and more preferably 0.7-0.9. In addition, the artificial graphite may have a particle diameter of 5-30 μm, preferably 10-25 μm.

The artificial graphite may have a specific surface area of 0.5-5 m²/g, particularly 0.6-4 m²/g. Preferably, the artificial graphite has a smaller specific surface area as compared to the specific surface area of natural graphite within the above-defined range. When the artificial graphite has an excessively small specific surface area beyond the above-defined range, output characteristics during charge/discharge may be degraded. On the other hand, when the specific surface area is excessively large, initial efficiency may be degraded undesirably.

The specific surface area of the artificial graphite may be determined by the BET (Brunauer-Emmett-Teller) method. For example, the specific surface area may be determined through the BET 6-point method based on nitrogen gas adsorption flow using a porosimetry analyzer (e.g. Belsorp-II mini, Bell Japan Inc.). This will be applied to the determination of the specific surface area of natural graphite as described hereinafter.

The artificial graphite may have a tap density of 0.7-1.15 g/cc, particularly 0.8-1.1 g/cc. When the tap density is less than 0.7 g/cc beyond the above-defined range, the contact area between particles is not sufficient to cause degradation of adhesion and a decrease in capacity per volume. When the tap density is larger than 1.15 g/cc, the tortuosity and electrolyte wettability of an electrode may be decreased to cause degradation of output characteristics during charge/discharge undesirably.

Herein, the tap density may be determined by using an instrument, IV-1000 available from COPLEY Co., introducing 50 g of a precursor to a 100 cc cylinder for tapping with a test instrument, SEISHIN (KYT-4000), and applying tapping thereto 3000 times. This will be applied to the determination of the tap density of natural graphite as described hereinafter.

In addition, the artificial graphite may have an average particle diameter ($D_{50}$) of 8-30 μm, particularly 12-25 μm. When the artificial graphite has an average particle dimeter ($D_{50}$) of less than 8 μm, it has an increased specific surface area to cause a decrease in the initial efficiency of a secondary battery, resulting in degradation of the performance of the battery. When the average particle diameter ($D_{50}$) is larger than 30 μm, adhesion may be degraded and packing density may be reduced to cause a decrease in capacity.

For example, the average particle diameter of artificial graphite may be determined by using the laser diffraction method. The laser diffraction method generally allows determination of particle diameter ranging from the submicron region to several millimeters and provides results with high reproducibility and high resolution. The average particle diameter ($D_{50}$) of artificial graphite may be defined as the particle diameter at a point of 50% in the particle diameter distribution. For example, the average particle diameter ($D_{50}$) of artificial graphite may be determined by dispersing an artificial graphite in an ethanol/water solution, introducing the resultant product to a commercially available laser diffraction particle size analyzer (e.g. Microtrac MT 3000), irradiating ultrasonic waves with a frequency of about 28 kHz thereto at an output of 60 W, and calculating the average particle diameter ($D_{50}$) at a point of 50% in the particle diameter distribution determined by the analyzer.

According to the present disclosure, the negative electrode active material b may be selected with no particular limitation, as long as it is artificial graphite having the above-described properties.

Meanwhile, the negative electrode active material a has a core-shell structure having core particles, and a coating layer at least partially or totally covering the surfaces of the core particles, wherein the core particle is an artificial graphite having the above-described properties, and the coating layer includes a carbonaceous material.

According to an embodiment of the present disclosure, the coating layer may include a low-crystallinity carbonaceous material and/or an amorphous carbonaceous material. According to an embodiment of the present disclosure, the content of the low-crystallinity and/or amorphous carbonaceous material may be 70 wt % or more, 80 wt % or more, or 90 wt % or more, based on the total weight of the coating layer. The area covered by the coating layer may be 70% or more, 80% or more, or 90% or more, based on the surface area of artificial graphite particles. In addition, according to an embodiment of the present disclosure, the coating layer may have a thickness of 5-1,000 nm, and the thickness may be controlled suitably within the above-defined range.

According to an embodiment of the present disclosure, the low-crystallinity carbonaceous material may include at least one of soft carbon and/or products having a structure with low crystallinity, obtained by heat treating soft carbon at a temperature of about 1,000° C. or lower. Meanwhile, the amorphous carbonaceous material may include at least one selected from hard carbon, carbon black, thermal black and acetylene black.

According to an embodiment of the present disclosure, the coating layer may be formed by coating artificial graphite particles with a carbon precursor material, such as a polymeric material or pitch, and heat treating (carbonizing) the resultant product at a temperature of about 500-1,000° C. Herein, when the carbonization temperature is excessively high, it may affect the crystal structure of an artificial graphite. Thus, it is possible to control the carbonization temperature within the above-defined range. According to another embodiment of the present disclosure, the coating layer may be formed by coating conductive carbon particles directly on the surfaces of artificial graphite particles. Particular examples of such conductive carbon particles include carbon black, such as acetylene black, thermal black, furnace black or channel black, carbon fibers, carbon tubes, or the like. However, the scope of the present disclosure is not limited thereto.

Meanwhile, according to an embodiment of the present disclosure, the upper layer includes the negative electrode active material a and the negative electrode active material b, wherein the content of the negative electrode active material b may be 40-60 wt % based on 100 wt % of the total content of the negative electrode active material a and the negative electrode active material b. In addition, the lower layer includes the negative electrode active material a and the negative electrode active material b, wherein the content of the negative electrode active material b may be 40-60 wt % based on 100 wt % of the total content of the negative electrode active material a and the negative electrode active material b.

Meanwhile, according to an embodiment of the present disclosure, the upper layer and the lower layer may include the same negative electrode active material a and the same negative electrode active material b.

Meanwhile, according to an embodiment of the present disclosure, the carbon coating layer may be present in an amount of 1-10 wt % based on 100 wt % of the negative electrode active material a. For example, the carbon coating layer may be present at a ratio of 2-6 wt %.

Meanwhile, according to an embodiment of the present disclosure, the content of the carbon coating layer in the upper layer depends on the content of the negative electrode active material a. For example, the content of the carbon coating layer may be 1-5 wt % based on 100 wt % of the upper layer negative electrode active material. In addition, the content of the carbon coating layer in the lower layer may be 1-4 wt % based on 100 wt % of the lower layer negative electrode active material. When the proportion of the coated negative electrode active material in the upper layer is increased, electroconductivity is improved, which is advantageous to quick charging.

Meanwhile, according to an embodiment of the present disclosure, the proportion of the content of the binder in the negative electrode mixture of the lower layer may be relatively higher than the proportion of the content of the binder in the negative electrode mixture of the upper layer. For example, the lower layer may include the binder in an amount of 2.4-3 wt % based on 100 wt % of the lower layer negative electrode mixture, and the content of the binder in the upper layer is designed in such a manner that it may be smaller than the content of the binder in the lower layer.

In a process for manufacturing an electrode, while the solvent migrates toward the surface of the electrode and is evaporated upon the drying of the electrode slurry, the binder resin migrates together with the solvent toward the electrode surface so that the binder resin may be localized in the surface portion of the electrode. According to the present disclosure, the binder content ratio of the upper layer to the lower layer is designed in the above-mentioned manner, and thus such localization of the binder resin in the electrode top layer portion is prevented to reduce the charge transfer resistance (Rct) on the electrode surface, and the binder resin remains in the lower layer to prevent degradation of the binding force between the electrode active material layer and the current collector.

Meanwhile, according to the present disclosure, the negative electrode may be obtained by forming the lower layer on the top of the negative electrode current collector, and forming the upper layer on the top of the lower layer. The method for forming the lower layer and the upper layer may include a dry-on-wet process or a wet-on-wet process. The dry-on-wet process includes applying the first negative electrode slurry containing the lower negative electrode mixture to the current collector, followed by drying, and applying the second negative electrode slurry containing the upper layer negative electrode mixture, followed by drying. The wet-on-wet process includes applying the first negative electrode slurry, applying the second negative electrode slurry, before the first negative electrode slurry is dried, and subjecting the lower layer and the upper layer to a drying step at the same time. For example, according to an embodiment of the present disclosure, the negative electrode may be obtained through a wet-on-wet process. Particularly, two types of slurry may be coated at the same time by using a double slot die, or the like, and carrying out drying to form the lower layer and the upper layer of the negative electrode active material layer.

The method for coating the slurry is not particularly limited, as long as it is used conventionally in the art. For example, a coating process using a slot die, Mayer bar coating process, a gravure coating process, a dip coating process, a spray coating process, etc. may be used.

In the method according to an embodiment of the present disclosure, the current collector is not particularly limited, as long as it has conductivity, while not causing any chemical change in the corresponding battery. For example, copper, stainless steel, aluminum, nickel, titanium, baked carbon, copper or stainless steel surface-treated with carbon, nickel, titanium, silver, etc., aluminum-cadmium alloy, or the like, may be used.

Although the current collector is not particularly limited in its thickness, it may have a currently used thickness of 3-500 μm.

Particular examples of the binder include various types of polymers, such as polyvinylidene fluoride-co-hexafluoro-propylene (PVDF-co-HFP), polyvinylidene fluoride, poly-acrylonitrile, polymethyl methacrylate, polyvinyl alcohol, carboxymethyl cellulose (CMC), starch, hydroxypropyl cellulose, regenerated cellulose, polyvinyl pyrrolidone, poly-tetrafluoroethylene, polyethylene, polypropylene, polyacrylate, styrene butadiene rubber (SBR), fluoro-rubber, various copolymer thereof, or the like.

The solvent may include N-methyl-2-pyrrolidone, acetone, water, or the like.

The conductive material is not particularly limited, as long as it causes no chemical change in the corresponding battery and has conductivity. Particular examples of the conductive material include: carbon black, such as acetylene black, Ketjen black, channel black, furnace black, lamp black or thermal black; conductive fibers, such as carbon fibers or metallic fibers; SWCNT, MWCNT; fluorocarbon; metal powder, such as, aluminum or nickel powder; conductive whisker, such as zinc oxide or potassium titanate; conductive metal oxide, such as titanium oxide; conductive materials, such as polyphenylene derivatives, or the like.

According to an embodiment of the present disclosure, each of the negative electrode active material layer, i.e. the upper layer and the lower layer, may further include a thickener, if necessary. Particular examples of the thickener may include at least one selected from carboxymethyl cellulose (CMC), carboxyethyl cellulose, polyvinyl pyrrolidone, or the like.

Meanwhile, according to an embodiment of the present disclosure, the dried negative electrode may be further subjected to a pressurizing step. The pressurizing step may be carried out by using a method, such as roll pressing, used conventionally in the art. Meanwhile, the pressurizing step may be carried out under heating.

In another aspect of the present disclosure, there is provided a lithium secondary battery including the negative electrode obtained as described above. Particularly, the lithium secondary battery may be obtained by injecting a lithium salt-containing electrolyte to an electrode assembly including a positive electrode, the negative electrode as described above and a separator interposed between both electrodes.

The positive electrode may be obtained by mixing a positive electrode active material, a conductive material, a binder and a solvent to form a slurry, and coating the slurry directly onto a metal current collector, or casting the slurry onto a separate support, peeling a positive electrode active material film from the support and laminating the film on a metal current collector.

The positive electrode active material used in the positive electrode active material layer may be any one active material particle selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic ratio of an element forming oxide, and $0 \leq x < 0.5$, $0 \leq y < 0.5$, $0 \leq z < 0.5$, and $0 < x+y+z \leq 1$), or a mixture of at least two of them.

Meanwhile, the same conductive material, binder and solvent as used for manufacturing the negative electrode may be used.

The separator may be a conventional porous polymer film used conventionally as a separator. For example, the porous polymer film may be a porous polymer film made of a polyolefinic polymer, such as ethylene homopolymer, propylene homopolymer, ethylene-butene copolymer, ethylene/hexene copolymer or ethylene/methacrylate copolymer. Such a porous polymer film may be used alone or in the form of a laminate. In addition, an insulating thin film having high ion permeability and mechanical strength may be used. The separator may include a safety reinforced separator (SRS) including a ceramic material coated on the surface of the separator to a small thickness. In addition, a conventional porous non-woven web, such as non-woven web made of high-melting point glass fibers or polyethylene terephthalate fibers, may be used, but the scope of the present disclosure is not limited thereto.

The electrolyte has an ion conductivity of 6.5 mS/cm or more, and includes a lithium salt as an electrolyte salt and an organic solvent for dissolving the lithium salt.

Any lithium salt used conventionally for an electrolyte for a secondary battery may be used without particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$. According to an embodiment of the present disclosure, the lithium salt may have a concentration of 0.8-1.4 M in the electrolyte.

The organic solvent contained in the electrolyte may be any organic solvent used conventionally without particular limitation. Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulfolane, gamma-butyrolactone, propylene sulfite, and tetrahydrofuran.

Particularly, among the carbonate-based organic solvents, ethylene carbonate and propylene carbonate, which are cyclic carbonates, are organic solvents having a high viscosity and a high dielectric constant, and thus may be used preferably, since they can dissociate the lithium salt in the electrolyte with ease. When such a cyclic carbonate is used after mixing it with a linear carbonate having a low viscosity and a low dielectric constant, such as dimethyl carbonate or diethyl carbonate, it is possible to prepare an electrolyte having higher electrical conductivity, more preferably.

Optionally, the electrolyte used according to the present disclosure may further include additives contained in the conventional electrolyte, such as an overcharge-preventing agent, or the like.

The lithium secondary battery according to an embodiment of the present disclosure may be obtained by interposing the separator between the positive electrode and the negative electrode to form an electrode assembly, introducing the electrode assembly to a pouch, a cylindrical battery casing or a prismatic battery casing, and then injecting the electrolyte thereto. In a variant, the lithium secondary battery may be obtained by stacking the electrode assemblies, impregnating the stack with the electrolyte, and introducing the resultant product to a battery casing, followed by sealing.

According to an embodiment of the present disclosure, the lithium secondary battery may be a stacked, wound, stacked and folded or cable type battery.

The lithium secondary battery according to the present disclosure may be used for a battery cell used as a power source for a compact device, and may be used preferably as a unit battery for a medium- or large-size battery module including a plurality of battery cells. Particular examples of such medium- or large-size devices include electric vehicles, hybrid electric vehicles, plug-in hybrid electric vehicles, power storage systems, or the like. Particularly, the lithium secondary battery may be useful for batteries for hybrid electric vehicles and new & renewable energy storage batteries, requiring high output.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

(1) Example 1

1) Preparation of Negative Electrode Active Material a

An artificial graphite having a $D_{50}$ of 15 μm, a specific surface area of 0.9 $m^2/g$ and a degree of orientation of 13 was prepared and coated with pitch, and carbonization was carried out at 1,100-1,300° C. to form a carbonaceous material coating layer on the surface of an artificial graphite. The coating layer had a thickness of about 800 nm, and the content of the coating layer was about 4 wt % based on 100 wt % of the negative electrode active material particles a.

2) Preparation of Negative Electrode Active Material b

An artificial graphite having a $D_{50}$ of 18 μm, a specific surface area of 1.3 $m^2/g$ and a degree of orientation of 18.1 was prepared.

3) Manufacture of Negative Electrode

Preparation of Slurry for Lower Layer
A negative electrode active material, super C65 as a conductive material, styrene butadiene rubber (SBR) as a binder and carboxymethyl cellulose (CMC) as a thickener were introduced to distilled water at a weight ratio of 95.35:0.5:3.0:1.15 to prepare a slurry for a lower layer. In the negative electrode active material, the negative electrode active material a and the negative electrode active material b were mixed at a weight ratio of 50:50. Meanwhile, the total content of the carbon coating layer in the lower layer was set to 2 wt % based on 100 wt % of the lower layer negative electrode active material.

Preparation of Slurry for Upper Layer
A negative electrode active material, Super C65 as a conductive material, styrene butadiene rubber (SBR) as a binder and carboxymethyl cellulose (CMC) as a thickener were introduced to distilled water at a weight ratio of 97.35:0.5:1.0:1.15 to prepare a slurry for an upper layer. In the negative electrode active material, the negative electrode active material a and the negative electrode active material b were mixed at a weight ratio of 50:50. Meanwhile, the total content of the carbon coating layer in the upper layer was set to 2 wt % based on 100 wt % of the upper layer negative electrode active material.

Then, the lower layer slurry was applied to a negative electrode current collector (copper foil, thickness 8 μm), the upper layer slurry was applied thereto right after applying the lower layer slurry, and the slurry was dried with hot air in a dryer to obtain an electrode. The dryer was controlled to a temperature range of about 120-130° C. The resultant electrode had a thickness of 150 μm, wherein the lower layer had a thickness ratio of about 50%. In addition, the negative electrode had a porosity of 25.2 vol % and a degree of orientation of 10.7.

4) Comparative Example 1

The negative electrode active material b, Super C65 as a conductive material, styrene butadiene rubber (SBR) as a binder and carboxymethyl cellulose (CMC) as a thickener were introduced to distilled water at a weight ratio of 95.35:0.5:3.0:1.15 to prepare a slurry for a lower layer. In addition, the negative electrode active material a, Super C65 as a conductive material, styrene butadiene rubber (SBR) as a binder and carboxymethyl cellulose (CMC) as a thickener were introduced to distilled water at a weight ratio of 97.35:0.5:1.0:1.15 to prepare a slurry for an upper layer. Then, the lower layer slurry was applied to a negative electrode current collector (copper foil, thickness 8 μm), the upper layer slurry was applied thereto right after applying the lower layer slurry, and the slurry was dried with hot air in a dryer to obtain an electrode. The dryer was controlled to a temperature range of about 120-130° C. The resultant electrode had a thickness of 150 μm, wherein the lower layer had a thickness ratio of about 50%. In addition, the negative electrode had a porosity of 25.2 vol % and a degree of orientation of 10.7.

5) Comparative Example 2

Spheronized natural graphite ($D_{50}$ 9 μm, specific surface area 2.1 $m^2/g$), Super C65 as a conductive material, styrene butadiene rubber (SBR) as a binder and carboxymethyl cellulose (CMC) as a thickener were introduced to distilled water at a weight ratio of 95.35:0.5:3.0:1.15 to prepare a slurry for a lower layer. In addition, the negative electrode active material a, Super C65 as a conductive material, styrene butadiene rubber (SBR) as a binder and carboxymethyl cellulose (CMC) as a thickener were introduced to distilled water at a weight ratio of 97.35:0.5:1.0:1.15 to prepare a slurry for an upper layer. Then, the lower layer slurry was applied to a negative electrode current collector (copper foil, thickness 8 μm), the upper layer slurry was applied thereto right after applying the lower layer slurry, and the slurry was dried with hot air in a dryer to obtain an electrode. The dryer was controlled to a temperature range of about 120-130° C. The resultant electrode had a thickness of 150 μm, wherein the lower layer had a thickness ratio of about 50%. In addition, the negative electrode had a porosity of 25.2 vol % and a degree of orientation of 10.7.

6) Comparative Example 3

The negative electrode active material a, Super C65 as a conductive material, styrene butadiene rubber (SBR) as a binder and carboxymethyl cellulose (CMC) as a thickener were introduced to distilled water at a weight ratio of 95.35:0.5:3.0:1.15 to prepare a slurry for a lower layer. In addition, the negative electrode active material a, Super C65 as a conductive material, styrene butadiene rubber (SBR) as a binder and carboxymethyl cellulose (CMC) as a thickener were introduced to distilled water at a weight ratio of 97.35:0.5:1.0:1.15 to prepare a slurry for an upper layer. Then, the lower layer slurry was applied to a negative electrode current collector (copper foil, thickness 8 μm), the upper layer slurry was applied thereto right after applying the lower layer slurry, and the slurry was dried with hot air in a dryer to obtain an electrode. The dryer was controlled to a temperature range of about 120-130° C. The resultant electrode had a thickness of 150 μm, wherein the lower layer had a thickness ratio of about 50%. In addition, the negative electrode had a porosity of 25.2 vol % and a degree of orientation of 10.7.

(2) Manufacture of Battery

Each of the negative electrodes prepared according to Example 1 and Comparative Examples 1-3 was used to obtain a battery.

A positive electrode was prepared as follows.

A positive electrode active material, $LiCoO_2$, a binder (PVDF) and a conductive material (acetylene black) were introduced to NMP at a weight ratio of 96.5:1.5:2 to prepare a slurry for forming a positive electrode active material layer (solid content 70 wt %). The slurry was applied to aluminum foil (thickness: about 10 μm) and dried at 60° C. for 6 hours to obtain a positive electrode.

A porous film (10 μm) made of polyethylene was prepared as a separator, and the positive electrode, the separator and the negative electrode were stacked successively and subjected to a lamination process of pressurizing the resultant stack at 80° C. to obtain an electrode assembly.

Then, the electrode assembly was introduced to a pouch-like battery casing, and an electrolyte was injected thereto to obtain a battery. The electrolyte was prepared by mixing ethylene carbonate, propylene carbonate, ethyl propionate and propyl propionate at a weight ratio of 2:1:2.5:4.5, and introducing $LiPF_6$ thereto at a concentration of 1.4 M.

(3) Evaluation of Capacity Retention and Swelling Ratio

1) 1.5 C Room Temperature Cycle

Each of the batteries according to Example 1 and Comparative Examples 1-3 was charged to 4.45 V at 1.5 C in a constant current (CC) mode and to a charge cut-off current of 0.005 C in a constant voltage (CV) mode, and then discharged at 1 C in a CC mode to 3 V. In this manner, 1000 charge/discharge cycles were repeated, and then the capacity retention was evaluated. The test was carried out at room temperature (25° C.). The results are shown in FIG. 1. In the case of the battery according to Example 1, it shows higher capacity retention as compared to the other batteries according to Comparative Examples 1-3.

Meanwhile, after determining the volumetric swelling ratio of each battery, it can be seen that the battery according to Example 1 shows a smaller volumetric swelling ratio as compared to the other batteries according to Comparative Examples 1-3.

2) 1.5 C High-Temperature Cycle

Figure 2:
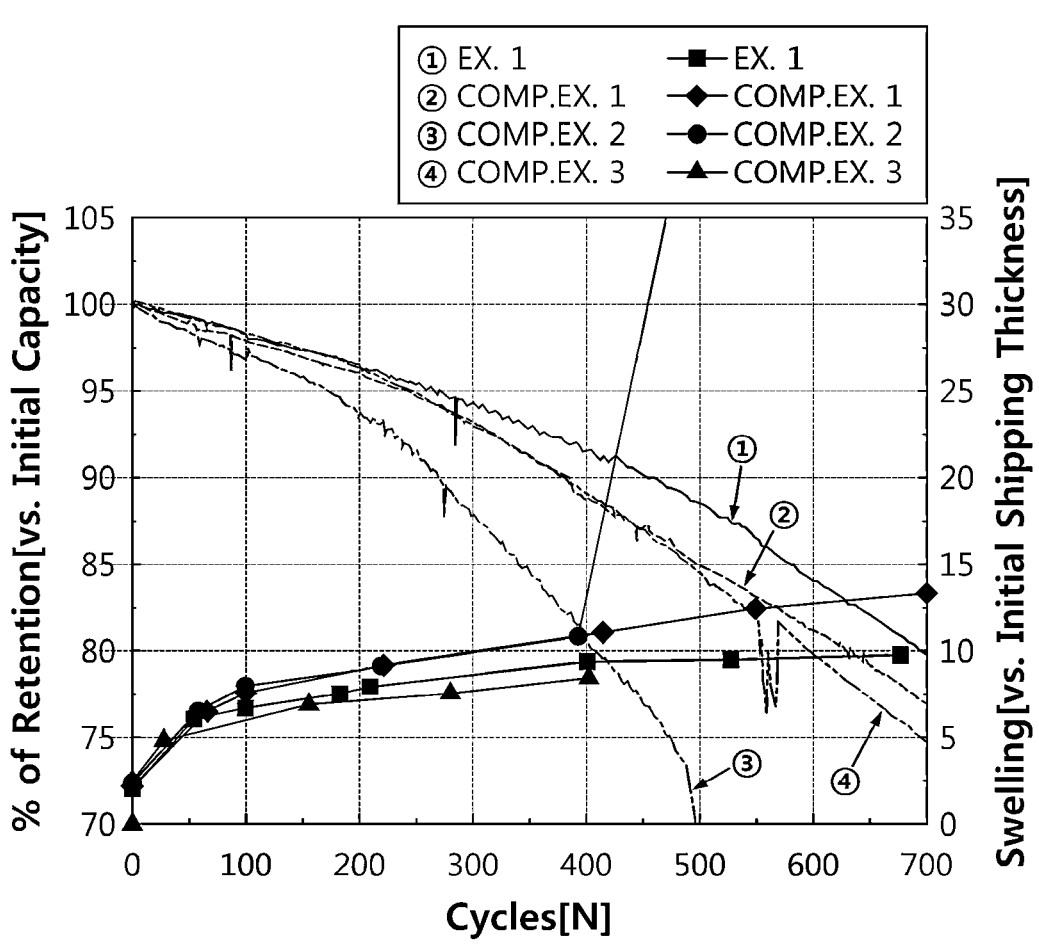

Each of the batteries according to Example 1 and Comparative Examples 1-3 was charged to 4.45 V at 1.5C in a constant current (CC) mode and to a charge cut-off current of 0.005 C in a constant voltage (CV) mode, and then discharged at 1 C in a CC mode to 3 V. In this manner, 700 charge/discharge cycles were repeated, and then the capacity retention was evaluated. The test was carried out at a high temperature (45° C.). The results are shown in FIG. 2. In the case of the battery according to Example 1, it shows higher capacity retention as compared to the other batteries according to Comparative Examples 1-3. Meanwhile, after determining the volumetric swelling ratio of each battery, it can be seen that the battery according to Example 1 shows a smaller volumetric swelling ratio as compared to the other batteries according to Comparative Examples 1-3.

3) 2.0 C Cycle

Figure 3:
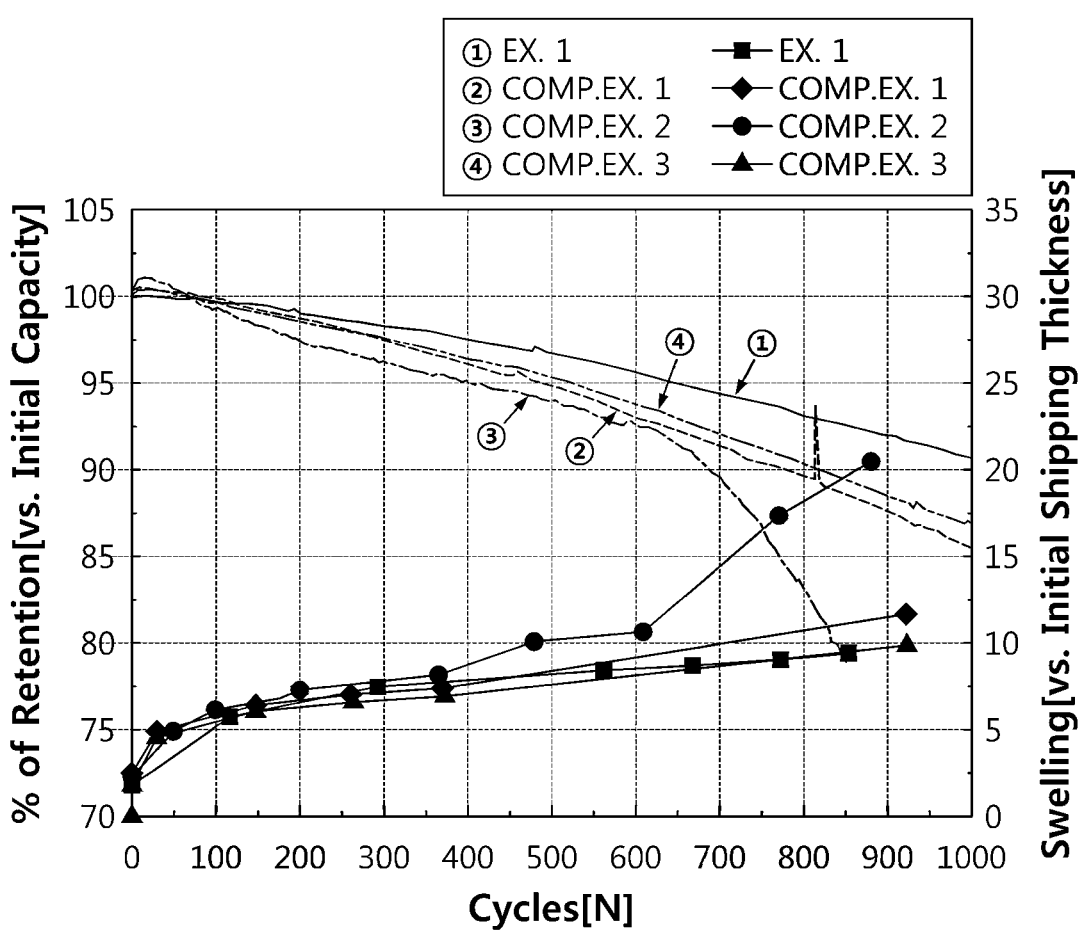

Each of the batteries according to Example 1 and Comparative Examples 1-3 was charged to 4.45 V at 2.0 C in a constant current (CC) mode and to a cut-off current of 0.005 C in a constant voltage (CV) mode, and then discharged at 1 C in a CC mode to 3 V. In this manner, 1000 charge/discharge cycles were repeated, and then the capacity retention was evaluated. The test was carried out at room temperature (25° C.). The results are shown in FIG. 3. In the case of the battery according to Example 1, it shows higher capacity retention as compared to the other batteries according to Comparative Examples 1-3. Meanwhile, after determining the volumetric swelling ratio of each battery, it can be seen that the battery according to Example 1 shows a smaller volumetric swelling ratio as compared to the other batteries according to Comparative Examples 1-3.

What is claimed is:

1. A negative electrode for a lithium-ion secondary battery, comprising a negative electrode current collector and a negative electrode active material layer disposed on at least one surface of the negative electrode current collector,
   wherein the negative electrode active material layer comprises a lower layer disposed on the at least one surface of the negative electrode current collector and an upper layer disposed on a top of the lower layer,
   each of the lower layer and the upper layer independently includes a negative electrode mixture containing a negative electrode active material, a conductive material and a binder, and
   the negative electrode active material includes a negative electrode active material a and a negative electrode active material b,
   the negative electrode active material a is an artificial graphite having a surface on which a carbonaceous material is coated,
   the negative electrode active material b is an artificial graphite having a surface on which the carbonaceous material is not coated,
   wherein a content of the negative electrode active material b in the upper layer is 40-60 wt % based on a total content of the negative electrode active material a and the negative electrode active material b in the upper layer, wherein a content of the negative electrode active material b in the lower layer is 40-60 wt % based on a total content of the negative electrode active material a and the negative electrode active material b in the lower layer, wherein the upper layer has a higher content of the negative electrode active material a than a content of the negative electrode active material a in the lower layer, wherein a binder content ratio of the negative electrode mixture in the lower layer is relatively higher than a binder content ratio of the negative electrode mixture in the upper layer, wherein the lower layer includes the binder in an amount of 2.4 to 3 wt % based on 100 wt % of the negative electrode mixture in the lower layer, the carbonaceous material coated on the artificial graphite is a carbon coating layer, and the carbon coating layer is included in an amount of 1 to 10 wt % based on 100 wt % of the negative electrode active material a.

2. The negative electrode for a lithium-ion secondary battery according to claim 1, wherein each of the artificial graphite of the negative electrode active material a and the artificial graphite of the negative electrode active material b independently has a degree of orientation, which is a ratio of $I_{110}$ to $I_{004}$ of particles of the artificial graphite of 3-25.

3. The negative electrode for a lithium-ion secondary battery according to claim 1, wherein each of the artificial graphite of the negative electrode active material a and the artificial graphite of the negative electrode active material b independently has a degree of orientation, which is a ratio of $I_{110}$ to $I_{004}$ of particles of the artificial graphite, of 12-25.

4. The negative electrode for a lithium-ion secondary battery according to claim 1, wherein each of the artificial graphite of the negative electrode active material a and the artificial graphite of the negative electrode active material b independently has a specific surface area of 0.5-5 m²/g.

5. The negative electrode for a lithium-ion secondary battery according to claim 1, wherein the carbonaceous material comprises a low-crystallinity carbonaceous material and/or an amorphous carbonaceous material.

6. The negative electrode for a lithium-ion secondary battery according to claim 1, wherein the upper layer and the lower layer comprise the same negative electrode active material a and the same negative electrode active material b.

7. A method for manufacturing the negative electrode as defined in claim 1, comprising: preparing each of a first negative electrode slurry for forming a lower layer negative electrode mixture and a second negative electrode slurry for forming an upper layer negative electrode mixture; and sequentially or simultaneously applying the first negative electrode slurry and the second negative electrode slurry onto the negative electrode current collector, followed by drying.

8. A secondary battery comprising: the negative electrode according to claim 1; a positive electrode comprising lithium cobalt oxide (LCO) or lithium nickel cobalt manganese oxide (NCM); an electrolyte having an ion conductivity of 6.5 mS/cm or more and containing a lithium salt at a concentration of 0.8-1.4 M; and a separator including a polyethylene porous film having a thickness of 3-15 µm; and optionally further comprising an inorganic coating layer disposed on the polyethylene porous film.

9. The negative electrode for a lithium-ion secondary battery according to claim 1, prepared by a manufacturing method comprising: preparing each of a first negative electrode slurry containing a lower layer negative electrode mixture and a second negative electrode slurry containing an upper layer negative electrode mixture; and sequentially or simultaneously applying the first negative electrode slurry and the second negative electrode slurry onto a negative electrode current collector, followed by drying.

10. The negative electrode for a lithium-ion secondary battery according to claim 1, wherein a content of the carbon coating layer in the lower layer is 1-4 wt % based on 100 wt % of the lower layer of the negative electrode active material layer.

11. A negative electrode for a lithium-ion secondary battery, comprising a negative electrode current collector and a negative electrode active material layer disposed on at least one surface of the negative electrode current collector, wherein the negative electrode active material layer comprises a lower layer disposed on the at least one surface of the negative electrode current collector and an upper layer disposed on a top of the lower layer, the lower layer and the upper layer include different compositions and formed by applying a slurry for the lower layer on the negative electrode current collector, and applying a slurry for the upper layer on the lower layer, each of the lower layer and the upper layer independently includes a negative electrode mixture containing a negative electrode active material, a conductive material and a binder, the negative electrode active material includes a negative electrode active material a and a negative electrode active material b, the negative electrode active material a is an artificial graphite having a surface on which a carbonaceous material is coated, the negative electrode active material b is an artificial graphite having a surface on which the carbonaceous material is not coated, and the negative electrode active material b is not heat treated with a carbon precursor material, wherein a content of the negative electrode active material b in the upper layer is 40-60 wt % based on a total content of the negative electrode active material a and the negative electrode active material b in the upper layer, wherein a content of the negative electrode active material b in the lower layer is 40-60 wt % based on a total content of the negative electrode active material a and the negative electrode active material b in the lower layer, the upper layer has a higher content of the negative electrode active material a than a content of the negative electrode active material a in the lower layer, the carbonaceous material coated on the artificial graphite is a carbon coating layer, and the artificial graphite of the negative electrode active material a has a specific surface area of 0.5-0.9 m²/g.

12. The negative electrode for a lithium-ion secondary battery according to claim 11, wherein each of the artificial graphite of the negative electrode active material a and the artificial graphite of the negative electrode active material b independently has a degree of orientation, which is a ratio of $I_{110}$ to $I_{004}$ of particles of the artificial graphite of 3-25.

13. The negative electrode for a lithium-ion secondary battery according to claim 11, wherein each of the artificial graphite of the negative electrode active material a and the artificial graphite of the negative electrode active material b independently has a degree of orientation, which is a ratio of $I_{110}$ to $I_{004}$ of particles of the artificial graphite, of 12-25.

14. The negative electrode for a lithium-ion secondary battery according to claim 11, wherein the artificial graphite of the negative electrode active material b has a specific surface area of 0.5-5 $m^2/g$.

15. The negative electrode for a lithium-ion secondary battery according to claim 11, wherein the carbonaceous material comprises a low-crystallinity carbonaceous material and/or an amorphous carbonaceous material.

* * * * *